(12) United States Patent
Kodandaramaiah et al.

(10) Patent No.: US 12,345,248 B2
(45) Date of Patent: Jul. 1, 2025

(54) VALVE ASSEMBLIES FOR A DIAPHRAGM PUMP

(71) Applicant: PSG GERMANY GMBH, Duisburg (DE)

(72) Inventors: Charankumar Kodandaramaiah, Bangalore (IN); Praveen Chandrashekaraiah, Bangalore (IN); Simon Nettesheim, Krefeld (DE); Daniel Gisbertz, Bottrop (DE)

(73) Assignee: PSG Germany GmbH, Duisburg (DE)

( * ) Notice: Subject to any disclaimer, the term of this patent is extended or adjusted under 35 U.S.C. 154(b) by 403 days.

(21) Appl. No.: 17/435,185

(22) PCT Filed: Mar. 11, 2020

(86) PCT No.: PCT/EP2020/056574
§ 371 (c)(1),
(2) Date: Aug. 31, 2021

(87) PCT Pub. No.: WO2020/182921
PCT Pub. Date: Sep. 17, 2020

(65) Prior Publication Data
US 2022/0170560 A1 Jun. 2, 2022

(30) Foreign Application Priority Data
Mar. 13, 2019 (DE) .................. 10 2019 106 370.1

(51) Int. Cl.
*F04B 43/02* (2006.01)
*F04B 53/10* (2006.01)
(52) U.S. Cl.
CPC ........ *F04B 43/026* (2013.01); *F04B 53/1065* (2013.01)

(58) Field of Classification Search
CPC ........ F04B 43/0045; F04B 43/025–026; F04B 43/028; F04B 45/043; F04B 53/1065; F16K 15/148; Y10T 137/789
(Continued)

(56) References Cited

U.S. PATENT DOCUMENTS 2,625,886 A 1/1953 Browne
2,747,612 A 5/1956 Shih-Ying
(Continued)

FOREIGN PATENT DOCUMENTS

CN 201547334 8/2010
CN 201851317 U * 6/2011
(Continued)

OTHER PUBLICATIONS

EP Office Action in European Appln. No. 20711561.9, dated Jun. 21, 2023, 10 pages (with Machine Translation).
(Continued)

*Primary Examiner* — Alexander B Comley
(74) *Attorney, Agent, or Firm* — Fish & Richardson P.C.

(57) ABSTRACT

The invention relates to a valve assembly for a diaphragm pump, the valve assembly having an inlet side and an outlet side. A first outlet channel (23) leads from an inlet opening (24) arranged on the inlet side to an outlet opening (25) arranged on the outlet side, and a second outlet channel (26) leads from an inlet opening (27) arranged on the inlet side to an outlet opening (28) arranged on the outlet side. An inlet channel (30) has a first part (31) and a second part (32), the second part (32) having an outlet opening (33), which is arranged on the inlet side, and the first part (31) extending at an angle to the second part (32). An inlet valve body (40) is provided at the outlet opening (33) of the second part (32) of the inlet channel (30), and a first outlet valve body (41) is provided at the outlet opening (25) of the first outlet
(Continued)

Figure 1:
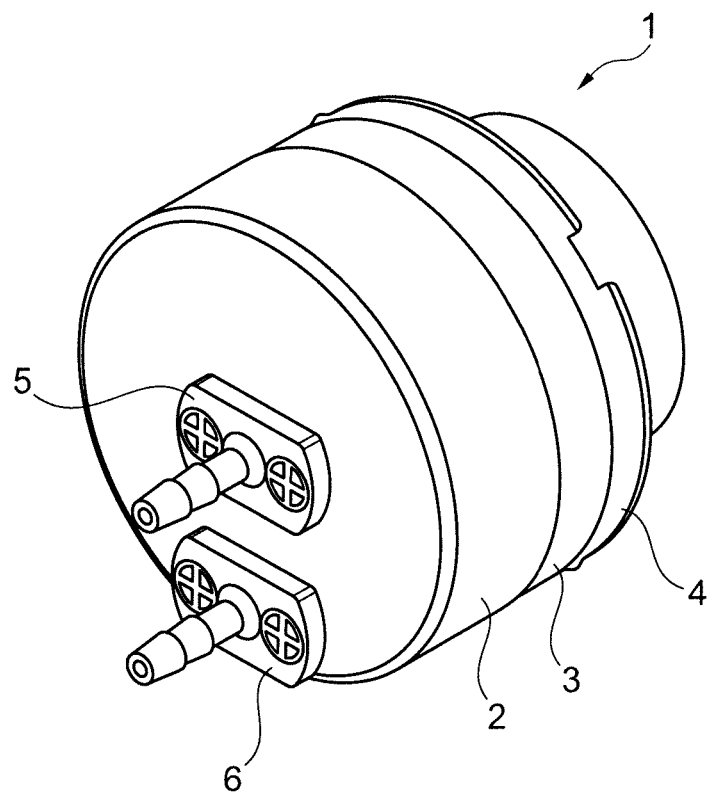

channel (23). The outlet opening (28) of the second outlet channel (26) is closed and opened either by a second outlet valve body or also by the first outlet valve body (41).

20 Claims, 7 Drawing Sheets

(58) Field of Classification Search
USPC .......................................................... 137/849
See application file for complete search history.

(56) References Cited

U.S. PATENT DOCUMENTS

| | | | |
|---|---|---|---|
| 2,834,295 A | 5/1958 | Georg | |
| 3,071,118 A | 1/1963 | Wilden | |
| 3,555,966 A | 1/1971 | Coniglo | |
| 3,630,642 A | 12/1971 | Osterman | |
| 3,782,863 A | 1/1974 | Rupp | |
| 3,838,946 A | 10/1974 | Schall | |
| 3,849,033 A | 11/1974 | Schall | |
| 3,900,276 A * | 8/1975 | Dilworth | F04B 53/1065 |
| | | | 417/542 |
| 4,155,535 A | 5/1979 | Seamone | |
| 4,158,530 A | 6/1979 | Bernstein | |
| 4,238,992 A | 12/1980 | Tuck, Jr. | |
| 4,247,264 A | 1/1981 | Wilden | |
| 4,270,441 A | 6/1981 | Tuck, Jr. | |
| 4,381,180 A | 4/1983 | Sell | |
| 4,386,888 A | 6/1983 | Verley | |
| 4,406,596 A | 9/1983 | Budde | |
| 4,472,115 A | 9/1984 | Rupp | |
| D275,858 S | 10/1984 | Wilden | |
| 4,494,912 A | 1/1985 | Pauliukonis | |
| 4,496,294 A | 1/1985 | Frikker | |
| 4,549,467 A | 10/1985 | Wilden et al. | |
| 4,610,605 A * | 9/1986 | Hartley | F04B 53/1065 |
| | | | 92/48 |
| 4,674,958 A | 6/1987 | Igarashi et al. | |
| D294,946 S | 3/1988 | Wilden | |
| D294,947 S | 3/1988 | Wilden | |
| 4,830,586 A | 5/1989 | Herter et al. | |
| 4,846,045 A | 7/1989 | Grach et al. | |
| 4,854,832 A | 8/1989 | Gardner et al. | |
| 5,007,803 A | 4/1991 | DiVito et al. | |
| 5,147,182 A | 9/1992 | Timmons | |
| 5,169,296 A | 12/1992 | Wilden | |
| 5,174,731 A | 12/1992 | Korver | |
| 5,213,485 A | 5/1993 | Wilden | |
| 5,257,914 A | 11/1993 | Reynolds | |
| 5,332,372 A | 7/1994 | Reynolds | |
| 5,349,895 A | 9/1994 | DiCarlo | |
| 5,368,452 A | 11/1994 | Johnson et al. | |
| 5,378,122 A | 1/1995 | Duncan | |
| 5,634,391 A | 6/1997 | Eady | |
| 5,687,633 A | 11/1997 | Eady | |
| 5,743,170 A | 4/1998 | Pascual | |
| 5,927,954 A | 7/1999 | Kennedy et al. | |
| 5,944,042 A | 8/1999 | Takahashi et al. | |
| 5,957,670 A | 9/1999 | Duncan et al. | |
| 6,048,183 A * | 4/2000 | Meza | F04B 53/1065 |
| | | | 417/569 |
| 6,102,363 A | 8/2000 | Eberwein | |
| 6,230,609 B1 | 5/2001 | Bender et al. | |
| 6,257,845 B1 | 7/2001 | Jack et al. | |
| 6,343,539 B1 | 2/2002 | Du | |
| 6,357,723 B2 | 3/2002 | Kennedy et al. | |
| 6,435,845 B1 | 8/2002 | Kennedy et al. | |
| RE38,239 E | 8/2003 | Duncan | |
| 6,644,941 B1 | 11/2003 | Able et al. | |
| 6,962,487 B2 | 11/2005 | Caldwell | |
| 7,063,516 B2 | 6/2006 | Bethel | |
| 7,125,229 B2 | 10/2006 | Distaso et al. | |
| 7,399,168 B1 | 7/2008 | Eberwein | |
| 7,452,166 B2 | 11/2008 | von Keudell et al. | |
| 7,517,199 B2 | 4/2009 | Reed et al. | |
| 7,527,483 B1 | 5/2009 | Glauber | |
| 7,658,598 B2 | 2/2010 | Reed et al. | |
| 8,047,222 B2 | 11/2011 | Lent et al. | |
| 8,231,310 B2 | 7/2012 | Sanwald | |
| 8,292,600 B2 | 10/2012 | Reed et al. | |
| 8,360,745 B2 | 1/2013 | Dietzsch et al. | |
| 8,485,792 B2 | 7/2013 | McCourt et al. | |
| 8,608,460 B2 | 12/2013 | McCourt et al. | |
| 9,127,657 B2 | 9/2015 | Glauber | |
| 9,943,196 B2 * | 4/2018 | Mak | B05B 7/2402 |
| 11,085,433 B2 | 8/2021 | Abel et al. | |
| 2002/0051717 A1 * | 5/2002 | Fukami | F04B 43/04 |
| | | | 417/413.1 |
| 2004/0033146 A1 | 2/2004 | Dai et al. | |
| 2006/0104829 A1 | 5/2006 | Reed et al. | |
| 2007/0122291 A1 | 5/2007 | Okumura et al. | |
| 2014/0377086 A1 | 12/2014 | Glauber | |
| 2015/0219089 A1 | 8/2015 | Glauber et al. | |
| 2016/0040664 A1 * | 2/2016 | Zhang | F04B 27/1009 |
| | | | 137/382 |
| 2017/0074260 A1 * | 3/2017 | Yan | A61H 1/008 |
| 2017/0143172 A1 * | 5/2017 | Ciavarella | F04B 23/04 |
| 2017/0290470 A1 | 10/2017 | Ciavarella et al. | |
| 2018/0142684 A1 * | 5/2018 | Abel | F04B 53/1072 |

FOREIGN PATENT DOCUMENTS

| | | | | |
|---|---|---|---|---|
| DE | 10117531 A1 * | 10/2002 | ............ | F04B 43/026 |
| DE | 202006016594 U1 * | 2/2007 | ............ | F04B 43/026 |
| DE | 202006020237 U1 * | 3/2008 | ............ | F04B 43/026 |
| DE | 102008035592 | 2/2010 | | |
| DE | 102010031860 A1 * | 1/2012 | .......... | B01F 15/0085 |
| EP | 1201926 A2 | 5/2002 | | |
| EP | 3327287 A1 | 5/2018 | | |
| GB | 2475524 A * | 5/2011 | .......... | F04B 43/0045 |
| JP | H06-42460 | 2/1994 | | |
| JP | H10-220357 | 8/1998 | | |
| JP | 2018-084233 | 5/2018 | | |

OTHER PUBLICATIONS

U.S. Appl. No. 62/068,433, Glauber, filed Oct. 24, 2014.
A1 Presher, "Intelligent Air Valve", Fluid Power/Power Transmission, Oct. 2009, 3 pages.
International Preliminary Report on Patentability in International Appln. No. PCT/EP2020/056574, dated Jun. 29, 2020, 27 pages (with English Translation).
International Search Report and Written Opinion in International Appln. No. PCT/EP2020/056574, dated Sep. 23, 2021, 20 pages (with English Translation).
Proportion-Air, "MizAir—Energy Savings Device for Air Operated Double Diaphragm Pumps," Oct. 2009, 4 pages.
Proportion-Air, "MizAir—Saves up to 50% Air Expense Required to Operate Diaphragm," Oct. 2009, 4 pages.
Proportion-Air, "Mizair, Installation and Maintenance, U.S. Pat. No. 7,517,199 (Additional Patents Pending)," Oct. 2, 2009, INMIZAIR-REV4, 6 pages.
Proportionair.com [online], "MizAir—MizAir Energy Savings Device for AODD's,", Mar. 29, 2011, retrieved on Aug. 21, 2012, retrieved from <http://www.proportionair.com/index.php/Custom-Capabilities/MizAir/flypage.tpl>, 1 page.
Wilden, Prior Art 2.68 Diaphragm, Mar. 12, 2009, 1 page.
Office Action in Japanese Appln. No. 2021-552682, mailed on Jan. 4, 2024, 14 pages (with English translation).
Office Action in Chinese Appln. No. 202080033141.7, mailed on Feb. 1, 2024, 19 pages (with English translation).

* cited by examiner

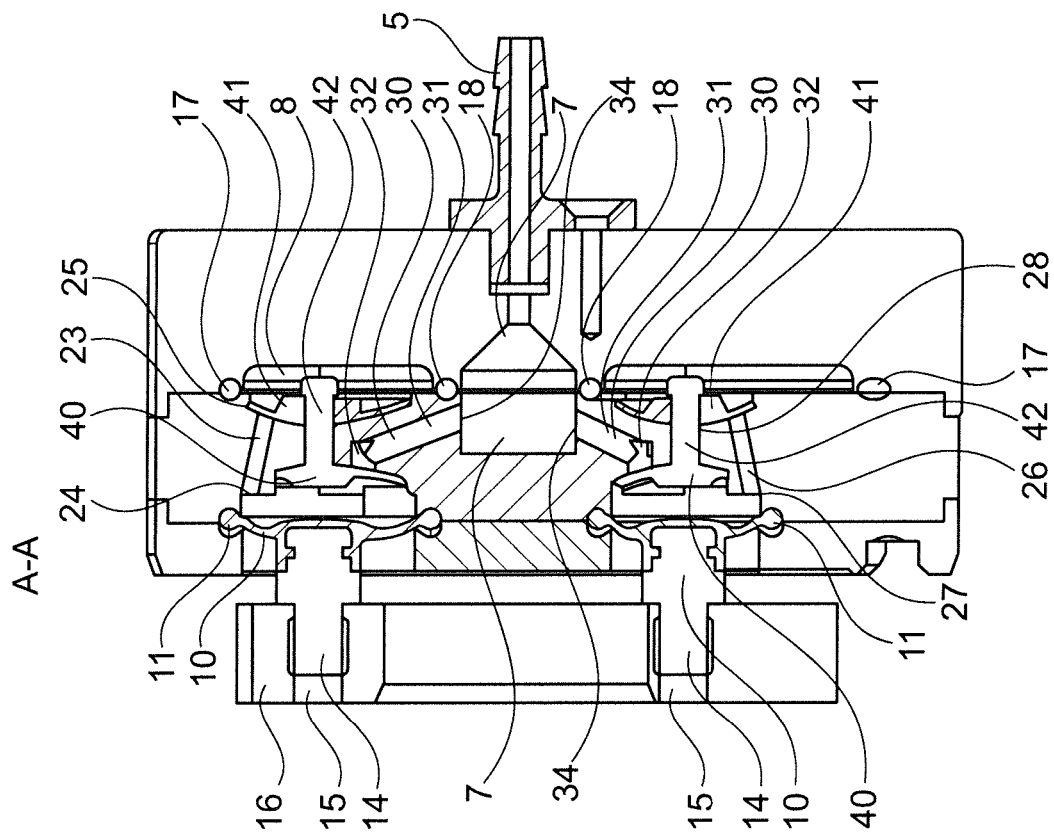
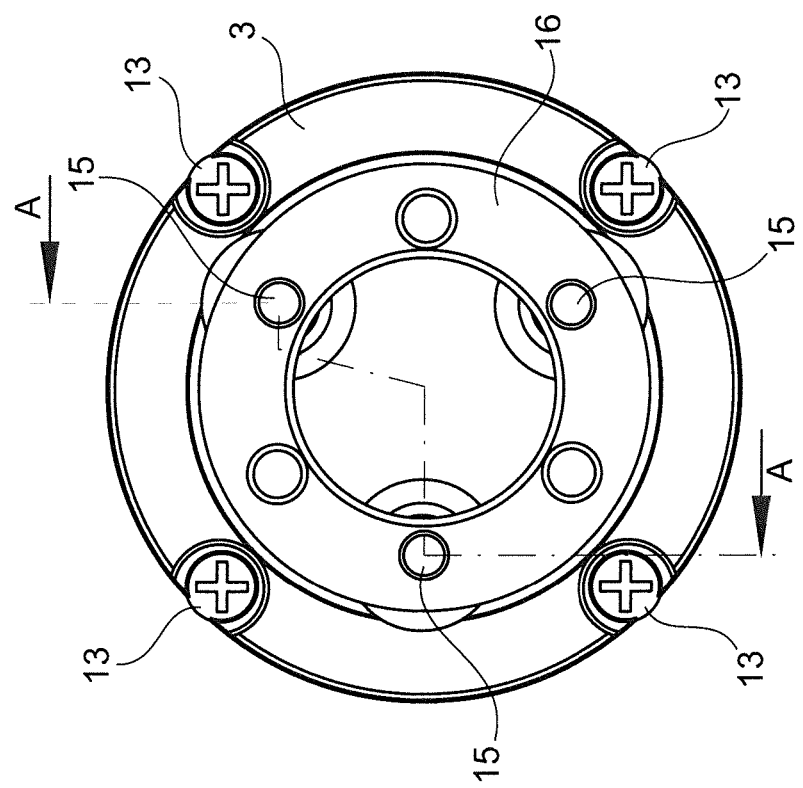

VALVE ASSEMBLIES FOR A DIAPHRAGM PUMP

The invention relates to a valve assembly for a diaphragm pump. The invention also relates to a valve body of a valve of a diaphragm pump. The invention also relates to a valve body of a valve of a diaphragm pump. The invention also relates to a valve plate of a diaphragm pump. The invention also relates to a diaphragm pump. The invention also relates to the use of a specially equipped inlet valve body for a diaphragm pump.

Diaphragm pumps, which have a pump head connected to a drive, are known from DE 101 17 531 A1 and DE 20 2006 020 237 U1. The pump head has a plurality of pumping chambers (four, for example), each of which is sealed off from a drive chamber by means of a pump diaphragm. The respective pump diaphragm is connected to a swash plate arranged in the drive chamber via an assigned pump element. In this case, a tumbling motion of the swash plate sets the pump diaphragm into a tumbling, axial, periodic pumping motion. The swash plate sits on a drive pin of a drive shaft connected to the drive. The drive pin is inclined with respect to the longitudinal axis of the drive shaft and connected to the swash plate via a ball bearing. In the diaphragm pump according to DE 101 17 531 and DE 20 2006 020 237 U1, an outlet chamber is arranged centrally and an inlet chamber is arranged concentrically around the outlet chamber.

In a diaphragm pump known from DE 10 2008 035 592 B4, the inlet chamber is arranged centrally and the outlet chamber is arranged concentrically to the inlet chamber. The outlet chamber has an outlet channel in its lower area in the vertical direction, a valve plate having the pumping chambers and valves being arranged between an intermediate plate part having the chambers and a diaphragm support part supporting the pump diaphragms, the inlet chamber of the intermediate plate part having the inlet valves in a recess of the valve plate and an inlet valve plate having the inlet valves being in front of the pumping chambers.

Such pumps are used in particular in the fields of chemistry, pharmacy, and biotechnology, in which the liquid to be pumped is sometimes very expensive, making it desirable that no or only a small volume of the pumped liquid remains in the diaphragm pump after the pumping process. Furthermore, the complete filling of such diaphragm pumps with the fluid without air pockets is advantageous for the pumping capacity.

Figure 4:
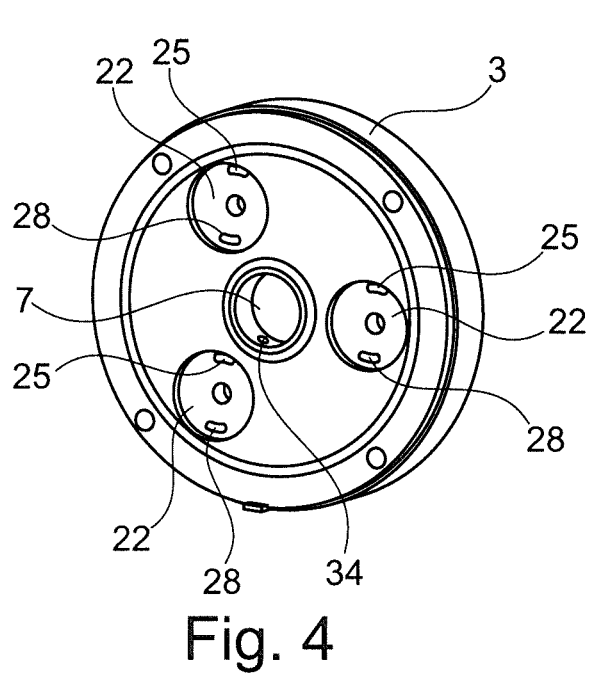

EP 3 327 287 A1 discloses a diaphragm pump with at least one pumping chamber, the pumping chamber being connected to an inlet chamber via an inlet valve and to an outlet chamber via an outlet valve, the inlet valve having an inlet opening that can be closed by an inlet valve body and the outlet valve having an outlet opening that can be closed by an outlet valve body. The diaphragm pump known from EP 3 327 287 A1 proposes designing the outlet opening in such a way that it surrounds the inlet opening or designing the inlet opening in such a way that it surrounds the outlet opening. EP 3 327 287 A1 provides, according to a preferred embodiment, for the outlet opening of the outlet valve to be formed by at least two outlet opening sections which are separate from one another and which surround the inlet opening. FIG. 4 of EP 3 327 287 A1 shows an embodiment in which a total of six outlet opening sections are provided which surround the inlet opening consisting of a plurality of individual holes.

Against this background, the invention was based on the object of proposing measures with which the arrangement of the inlet of a diaphragm pump, or the arrangement of an inlet chamber of a diaphragm pump, or the arrangement of an outlet, or the arrangement of an outlet chamber of a diaphragm pump can be designed more freely. In addition or as an alternative, it was an object of the present invention to sensibly design a pump with a low flow rate.

The object is achieved by the valve assembly according to claim 1, the valve body according to claim 8, valve plate according to claim 10, the diaphragm pump according to claim 11, the use according to claim 13, and the method according to claim 14. Advantageous embodiments are specified in the subclaims and the description below. The invention is based on the fundamental idea of breaking away from the sequential construction of a diaphragm pump known from the prior art in which, however, an inlet chamber and an outlet chamber are often provided, which are in front of a valve assembly in the direction of a longitudinal axis of the diaphragm pump.

This structure often leads to an outlet channel leading to an outlet valve, which for example connects the pumping chamber to an outlet chamber via the outlet valve, or an inlet channel closed with an inlet valve, which connects an inlet chamber to the pumping chamber via the inlet valve, either parallel or at a small (less than 45°) angle to the longitudinal axis of the diaphragm pump. This arrangement requires that the inlet chamber and the outlet chamber are arranged in front of the valve plate. This leads to an increased length of the pump. The invention has now recognized that advantages can be achieved with a change in the geometry of the inlet channel, namely if the inlet channel is designed such that it has a first part and a second part adjoining the first part, the second part having an outlet opening located on the inlet side and the first part extending at an angle to the second part. Such an embodiment makes it possible, for example, to have an inlet chamber protrude even closer towards the pumping chamber in the viewing direction of the longitudinal axis of the diaphragm pump. It is even possible to have the inlet chamber or sections of the inlet chamber protrude into the valve plate, for example into the center between valve assemblies arranged in a star shape around this center in the valve plate. The first part of the inlet channel, which according to the invention runs at an angle to the second part of the inlet channel, allows the fluid to be pumped from an inlet chamber initially at a clear angle (of more than 45°, for example) to the longitudinal axis of the diaphragm pump, wherein the fluid flow can then be brought through the second part of the inlet channel adjoining the first part in a flow direction that runs parallel to the longitudinal axis of the diaphragm pump or at a small angle to the diaphragm pump.

The invention essentially relates to a valve assembly for a diaphragm pump. A valve assembly is understood to be an assembly which has an inlet side and an outlet side, a first outlet channel, a second outlet channel, an inlet channel, an inlet valve body, and one or more outlet valve bodies. The valve assembly may have one or more bodies that have one side in common, which can be referred to as the inlet side, and which have another side in common, which can be referred to as the outlet side. The first outlet channel and the second outlet channel and the inlet channel can be embodied in this one body, or in several bodies which belong to the valve assembly. Furthermore, the inlet valve body can be connected to the body or bodies of the valve assembly in such a way that it can be moved between a closed position and an open position. Furthermore, the one or more outlet valve bodies can be connected to the one or more bodies that form the valve assembly in such a way that they can be moved between a closed position and an open position, but are otherwise carried by the one or more bodies. Embodiments are conceivable in which the inlet channel is embodied in a separate body. It is even further conceivable that the first outlet channel and the second outlet channel are embodied in a common body. It is also conceivable that the first outlet channel is embodied in a separate body and the second outlet channel in a separate body. If, in a preferred embodiment, the valve assembly should be composed of several bodies, the individual bodies of the valve assembly are preferably firmly connected to one another, so that the valve assembly forms a cohesive structure. In a preferred embodiment, however, the valve assembly has a single body in which the first outlet channel, the second outlet channel, and the inlet channel are embodied. In a preferred embodiment, this single body is a one-piece part of a superordinate component. For example, the invention also proposes a valve plate which has at least one valve assembly according to the invention. In such an embodiment, the valve plate preferably has a one-piece base body, the body through which the first outlet channel, the second outlet channel and the inlet channel are guided being a sub-area of this one-piece base body.

The invention is essentially aimed at the valve assembly defined in this way, since embodiments are conceivable in which the valve assembly is clearly spaced apart from a pumping chamber of a diaphragm pump and/or clearly spaced apart from an inlet chamber of a diaphragm pump or an inlet of a diaphragm pump is arranged and/or clearly spaced apart from an outlet chamber of a diaphragm pump or an outlet opening of a diaphragm pump. For example, embodiments are conceivable in which the inlet side forms a closure of a channel which then continues from the inlet side and opens into a pumping chamber. Embodiments are also conceivable in which the outlet side forms the end of a channel which continues from the outlet side and possibly opens into an outlet chamber of a diaphragm pump or leads to an outlet opening of a diaphragm pump. Since the advantages of the invention can already be realized with the special features of the valve assembly as described in claim 1, without having to rely on a specific relative position of the valve assembly to a pumping chamber, an inlet chamber, an inlet opening of a diaphragm pump, an outlet chamber or an outlet opening of a diaphragm pump, the invention is essentially aimed at the valve assembly configured in this way. The independent claims then describe the conceivable embedding of the valve assemblies in concrete components of the diaphragm pump, for example in a valve plate of a diaphragm pump, or the concrete embedding of such a valve assembly in a diaphragm pump.

The valve assembly has an inlet side. As will be described in detail below, the valve assembly has an inlet channel and a first outlet channel and a second outlet channel. The valve assembly thus serves to guide a fluid to a specific location via the inlet channel. This particular location is called the inlet side. Furthermore, the valve assembly serves to supply fluid that is located on the inlet side to another location via the first outlet channel and the second outlet channel. That other location is the outlet side. The exact geometric shapes of the inlet side and the outlet side are irrelevant to the invention's success. In a preferred embodiment, however, the inlet side is a surface. In a preferred embodiment, the outlet side is a surface. In a preferred embodiment, the inlet side is a circular or elliptical surface. In a preferred embodiment, the outlet side is a circular or elliptical surface. Embodiments are also conceivable in which the inlet side and/or the outlet side have a rectangular, particularly preferably a square surface, a triangular surface, a trapezoidal surface, the surface of a parallelogram, the surface of a polygon, particularly preferably a regular pentagon, a regular hexagon, a regular octagon, or a regular polygon. In a preferred embodiment, the surface center point of the inlet side and the surface center point of the outlet side lie on a line, particularly preferably on a horizontal line.

In a preferred embodiment, the inlet side runs parallel to the outlet side. If the inlet side or the outlet side is not flat, since particular embodiments are also conceivable in which the inlet side or the outlet side is designed in the shape of a dome or the inlet side or the outlet side has recessed areas that are connected with other areas of the inlet side or the outlet side via a step, geometric information on orientations of the inlet side or the outlet side relative to other objects relate in particular to the orientation of a representative surface for the inlet side or the outlet side. The substitute surface is understood to be the flat surface that runs perpendicular to the surface normal through the center of the surface of the inlet side and which is arranged in such a way that the sum of all shortest distances from each point on the inlet side to a point on the substitute level is the smallest.

The valve assembly according to the invention has a first outlet channel. This extends from an inlet opening arranged on the inlet side to an outlet opening arranged on the outlet side. Furthermore, the valve assembly according to the invention has a second outlet channel which extends from an inlet opening arranged on the inlet side to an outlet opening arranged on the outlet side. Embodiments are conceivable in which the valve assemblies have further, for example a third and/or fourth or possibly also a fifth or even additional outlet channels, each of which extends from an inlet opening on the inlet side to an outlet opening on the outlet side.

In a preferred embodiment, the first outlet channel and/or the second outlet channel each extend along a longitudinal axis. It is true that embodiments are also conceivable in which the first outlet channel and/or the second outlet channel do not extend entirely (or possibly not at all) along a longitudinal axis. Meandering designs of the first outlet channel or of the second outlet channel are also conceivable. However, the embodiments are preferred in which the respective outlet channel extends along a longitudinal axis. Such outlet channels can in particular also be easily produced.

The valve assembly according to the invention also has an inlet channel. The inlet channel is designed in several parts. It has at least a first part and a second part adjoining the first part. A fluid flowing through the inlet channel thus initially flows through the first part and then subsequently flows through the second part adjoining the first part. Embodiments are conceivable in which the inlet channel has additional parts. This can in particular be parts that are upstream of the first part. In such embodiments, the fluid would thus first flow through the other parts of the inlet channel, then enter the first part of the inlet channel and, after flowing through the first part, then enter the second part adjoining the first part. The second part of the inlet channel has an outlet opening which is arranged on the inlet side. In relation to the inlet side, the second part of the inlet channel thus represents the last part of the inlet channel. According to the invention, it is provided that the first part extends at an angle to the second part. In a preferred embodiment, the first part of the inlet channel extends (at least for part of its extension) along a longitudinal axis and the second part of the inlet channel extends (at least for part of its extension) along a longitudinal axis. The angle provided according to the invention between the first part and the second part is then particularly preferably the angle between these two longitudinal axes. In a preferred embodiment, the first part of the inlet channel extends entirely along a longitudinal axis. The second part of the inlet channel can have a part of its extension that does not extend along a longitudinal axis. In a preferred embodiment, at least that part of the second part of the inlet channel which adjoins the outlet opening of the second part of the outlet channel is designed such that it runs along a longitudinal axis. Embodiments are conceivable in which the part of the second part of the inlet channel directly adjoining the first part of the inlet channel is designed like a chamber. Such an embodiment can be particularly useful if, for example, a first part of the inlet channel extending along a longitudinal axis cannot be guided in such a way that its longitudinal axis intersects the longitudinal axis of a second part of the inlet channel extending entirely along a second longitudinal axis. Thus, embodiments are conceivable in which the first part of the inlet channel extends along a longitudinal axis and the part of the second part of the inlet channel adjoining the outlet opening extends along a longitudinal axis, but a chamber is necessary as a further part of the second part of the inlet channel; that chamber may have any geometric shape and mediates between the first part of the inlet channel and the part of the second part of the inlet channel which extends along a longitudinal axis. If any part of the first or second part of the inlet channel does not extend along a longitudinal axis, the angle between the first part and the second part can be determined by forming a line between the surface center of an initial opening and the geometric center of an end opening of the respective part of the inlet channel and determining the angle between those lines.

In a preferred embodiment, the first part of the inlet channel is adjoined to a single second part of the inlet channel. However, embodiments are also conceivable in which the inlet channel has a plurality of second parts. In such embodiments, the inlet channel has a first part, which then branches into a plurality of second parts, each of which adjoins the first part. If several second parts of the inlet channel are provided, each second part of the inlet channel has an outlet opening which is arranged on the inlet side. Such a branching embodiment can serve to distribute the exit of the fluid flowing through the inlet channel on the inlet side of the valve assembly over the inlet side. If only a single second part of the inlet channel is provided, only a single outlet opening is provided so that the fluid only exits at one point on the inlet side. If a branching embodiment is selected, several outlet openings can be provided and distributed over the inlet side so the fluid can exit at several points on that side.

The valve assembly according to the invention provides that an inlet valve body at the outlet opening of the second part of the inlet channel closes the outlet opening in a closed position and releases the outlet opening in an open position. Embodiments are conceivable in which the movement from the closed position to the open position of the inlet valve body is a rotary motion (in embodiments in which the inlet valve body is a ball with a passage bore through the ball, for example). Particularly preferred are embodiments in which the movement from the closed position to the open position is a pivoting motion or a folding motion in which a part of the valve is pivoted or folded in relation to another part of the valve. Especially in the particularly preferred embodiment, in which the inlet valve body is the valve body of an umbrella valve, there is a movement from the closed position to the open position in which edge sections of the umbrella valve pivot or fold relative to a central section of the umbrella valve. This movement is regularly brought about by a fluid pressure applied to the closed valve body; if the fluid pressure is not high enough, the umbrella valve's elastic restoring forces will cause its edge sections to pivot or fold back into the closed position. In a further embodiment, the inlet valve body performs a linear motion from the closed position into the open position. In a preferred embodiment, the second part of the inlet channel adjoining the outlet opening extends along a longitudinal axis, the movement of the inlet valve body from the closed position to the open position taking place along a line that corresponds to the longitudinal axis, or runs parallel to this longitudinal axis, or runs in one small angle of less than 45°, preferably less than 30°, more preferably less than 20° to this longitudinal axis. In a preferred embodiment, the inlet valve body is held by the valve assembly. It is particularly preferable that the inlet valve have a pin-like section arranged in a tubular recess of the valve assembly. In a preferred embodiment, the part of the inlet valve body that closes the outlet opening in its closed position is arranged at one end of the pin. This can be the screen of an umbrella valve, for example. In a preferred embodiment, a blocking element is provided on the opposite side of the pin and can fix the position of the inlet valve body in the closed position. For example: In one embodiment of the inlet valve body as an umbrella valve, this blocking element can define the position of the central section with respect to which the edge sections perform their pivoting or folding motions to open the valve. In embodiments in which the inlet valve body moves linearly, the blocking element can allow the inlet valve body to be moved from the closed position to the open position by moving the pin within the tube, but, by blocking further movement of the pin along the tube, prevents further movement of the inlet valve body and thus determines the opening position of the inlet valve body.

The valve assembly according to the invention provides that an outlet valve body on the outlet opening of the first outlet valve closes the outlet opening in a closed position and releases the outlet opening in an open position. Embodiments are conceivable in which the outlet valve body moves from the closed position to the open position using a rotary motion (embodiments in which the outlet valve body is a ball with a passage bore through the ball, for example). Embodiments are particularly preferred in which the movement from the closed position into the open position is a pivoting or folding motion in which part of the valve is pivoted or folded in relation to another part. Especially in the particularly preferred embodiment, in which the outlet valve body is the valve body of an umbrella valve, there is a movement from the closed position to the open position in which edge sections of the umbrella valve pivot or fold relative to a central section of the umbrella valve. This movement is regularly brought about by a fluid pressure applied to the closed valve body; if the fluid pressure is not high enough, the umbrella valve's elastic restoring forces will cause its edge sections to pivot or fold back into the closed position. In a further embodiment, the outlet valve body moves linearly from the closed position into the open position. In a preferred embodiment, the first outlet channel extends along a longitudinal axis, the movement of the outlet valve body from the closed position to the open position taking place along a line that corresponds to the longitudinal axis, or runs parallel to this longitudinal axis, or runs at a small angle of less than 45°, preferably less than 30°, more preferably less than 20° to this longitudinal axis. In a preferred embodiment, the outlet valve body is held by the valve assembly. It is particularly preferable that the outlet valve body have a pin-like section arranged in a tubular recess of the valve assembly. In a preferred embodiment, the part of the outlet valve body that closes the outlet opening in its closed position is arranged at one end of the pin. This can be the screen of an umbrella valve, for example. In a preferred embodiment, a blocking element provided on the opposite side of the pin can fix the position of the outlet valve body in the closed position. For example: In one embodiment of the outlet valve body as an umbrella valve, this blocking element can define the position of the central section, with respect to which the edge sections pivot or fold to open the valve. In embodiments in which the outlet valve body moves linearly, the blocking element can allow the outlet valve body to be moved from the closed position to the open position by moving the pin within the tube, but, by blocking a further movement of the pin along the tube prevents further movement of the outlet valve body and thus determines the opening position of the outlet valve body.

In the valve assembly according to the invention, it can be provided that a dedicated outlet valve body (a second outlet valve body) is provided for the second outlet channel, namely an outlet valve body which closes the outlet opening of the second outlet channel in a closed position and which releases the outlet opening of the second outlet channel in an open position. Embodiments are conceivable in which the movement from the closed position to the open position of the second outlet valve body is a rotary motion (embodiments in which the second outlet valve body is a ball with a passage bore through the ball, for example). Embodiments are particularly preferred in which the movement from the closed position into the open position is a pivoting or folding motion in which part of the valve is pivoted or folded in relation to another part. Especially in the particularly preferred embodiment, in which the second outlet valve body is the valve body of an umbrella valve, there is a movement from the closed position to the open position in which edge sections of the umbrella valve pivot or fold relative to a central section of the umbrella valve. This movement is regularly brought about by a fluid pressure applied to the closed valve body; if the fluid pressure is not high enough, the umbrella valve's elastic restoring forces will cause its edge sections to pivot or fold back into the closed position. In a further embodiment, the second outlet valve body moves linearly from the closed position into the open position. In a preferred embodiment, the second outlet channel extends along a longitudinal axis, the movement of the second outlet valve body from the closed position to the open position taking place along a line that corresponds or runs parallel to the longitudinal axis, or runs at a small angle of less than 45°, preferably less than 30°, more preferably less than 20°, to this longitudinal axis. In a preferred embodiment, the second outlet valve body is held by the valve assembly. It is particularly preferable that the second outlet valve body have a pin-like section arranged in a tubular recess of the valve assembly. In a preferred embodiment, the second outlet valve body, which closes the outlet opening in its closed position, is arranged at one end of the pin. This can be the screen of an umbrella valve, for example. In a preferred embodiment, a blocking element provided on the opposite side of the pin can fix the position of the second outlet valve body in the closed position. For example: In one embodiment of the second outlet valve body as an umbrella valve, this blocking element can define the position of the central section, with respect to which the edge sections pivot or fold to open the valve. In embodiments in which the second outlet valve body moves linearly, the blocking element can allow the second outlet valve body to be moved from the closed position to the open position by moving the pin within the tube, but, by blocking the pin from moving further along the tube, prevents the second outlet valve body from moving further, thus determining the opening position of the second outlet valve body.

However, embodiments of the valve assembly are also conceivable in which the outlet valve body, which closes the outlet opening of the first outlet channel in a closed position and releases the outlet opening of the first outlet channel in an open position, is designed in such a way that in the closed position, in which it closes the outlet opening of the first outlet channel, it also closes the outlet opening of the second outlet channel, whereby in the open position, in which it releases the outlet opening of the first outlet channel, it also releases the outlet opening of the second outlet channel. Such an embodiment can be achieved, for example, by a valve body of an umbrella valve, in which a first section, in particular a first edge section of the screen, can close the outlet opening of the outlet channel in the closed position of the outlet valve body and another section, in particular another edge section of the screen, can close the outlet opening of the second outlet channel in the closed position.

In a preferred embodiment of the valve assembly according to the invention, both the first and second outlet channels run along longitudinal axes. In a particularly preferred embodiment, the angle between the longitudinal axis of the first outlet channel and the longitudinal axis of the second outlet channel is less than 90°, preferably less than 45°, more preferably less than 30°, even more preferably less than 20°, even more preferably less than 10°, even more preferably less than 5°. It is particularly preferable that the two longitudinal axes run parallel.

In a preferred embodiment, the first outlet channel runs along a longitudinal axis and the second part of the inlet channel runs (at least for part of its extension) along a longitudinal axis. In a preferred embodiment, the angle between the longitudinal axis of the first outlet channel and the longitudinal axis of the second part of the inlet channel is less than 90°, preferably less than 45°, more preferably less than 30°, even more preferably less than 20°, even more preferably less than 10°, even more preferably less than 5°. It is particularly preferable that the two longitudinal axes run parallel.

In a preferred embodiment, the second outlet channel runs along a longitudinal axis and the second part of the inlet channel runs (at least for part of its extension) along a longitudinal axis. In a preferred embodiment, the angle between the longitudinal axis of the second outlet channel and the longitudinal axis of the second part of the inlet channel is less than 90°, preferably less than 45°, more preferably less than 30°, even more preferably less than 20°, even more preferably less than 10°, even more preferably less than 5°. It is particularly preferable that the two longitudinal axes run parallel.

In a preferred embodiment of the valve assembly according to the invention, the first part of the inlet channel runs along a longitudinal axis and the second part of the inlet channel runs (at least for part of its extent) along a longitudinal axis. In a particularly preferred embodiment, the angle between the longitudinal axis of the first part of the inlet channel and the longitudinal axis of the second part of the inlet channel is less than 90°, preferably less than 45°, more preferably less than 30°, even more preferably less than 20°, even more preferably less than 10°, even more preferably less than 5°. In a particularly preferred embodiment, the angle between the longitudinal axis of the first part of the inlet channel and the longitudinal axis of the second part of the inlet channel is greater than 5°, preferably greater than 10°, more preferably greater than 20°, even more preferably greater than 30°, even more preferably greater than 45°, even more preferably greater than 90°.

In a preferred embodiment, the first outlet channel runs along a longitudinal axis and the first part of the inlet channel runs along a longitudinal axis. In a preferred embodiment, the angle between the longitudinal axis of the first outlet channel and the longitudinal axis of the first part of the inlet channel is less than 90°, preferably less than 45°, more preferably less than 30°, even more preferably less than 20°, even more preferably less than 10°, even more preferably less than 5°. In a particularly preferred embodiment, the angle between the longitudinal axis of the first part of the inlet channel and the longitudinal axis of the first outlet channel is greater than 5°, preferably greater than 10°, more preferably greater than 20°, even more preferably greater than 30°, even more preferably greater than 45°, even more preferably greater than 90°.

In a preferred embodiment, the second outlet channel runs along a longitudinal axis and the first part of the inlet channel runs along a longitudinal axis. In a preferred embodiment, the angle between the longitudinal axis of the second outlet channel and the longitudinal axis of the first part of the inlet channel is less than 90°, preferably less than 45°, more preferably less than 30°, even more preferably less than 20°, even more preferably less than 10°, even more preferably less than 5°. In a particularly preferred embodiment, the angle between the longitudinal axis of the first part of the inlet channel and the longitudinal axis of the second outlet channel is greater than 5°, preferably greater than 10°, more preferably greater than 20°, even more preferably greater than 30°, even more preferably greater than 45°, even more preferably greater than 90°.

In a preferred embodiment, the first outlet channel is arranged above the second outlet channel. This design of a valve assembly can be used when installing such a valve assembly in a diaphragm pump to enable special ventilation and/or special emptying of the pumping chamber of the diaphragm pump. If the shape of the pumping chamber of the diaphragm pump, in which the valve assembly of this embodiment is used, is matched to the valve assembly in such a way that the inlet opening of the first outlet channel forms the uppermost point of the pumping chamber and/or the inlet opening of the second outlet channel forms the lowest point of the pumping chamber, the pumping chamber can be completely ventilated, since any air can be discharged from the pumping chamber through the first outlet channel located high above, or it can be completely emptied because any residual liquid can be discharged from the pumping chamber through the particularly deep second outlet channel.

In a preferred embodiment, the second part of the inlet channel is arranged between the first outlet channel and the second outlet channel. In a particularly preferred embodiment, the first outlet channel is arranged above the second part of the inlet channel and/or the second part of the inlet channel is arranged above the second outlet channel. Such an embodiment makes it possible to design the outlet opening of the inlet channel on the inlet side in the central area of the inlet side, while the inlet opening of the first outlet channel and the inlet opening of the second outlet channel on the inlet side are arranged more in the edge area of the inlet side. Such an embodiment allows the inlet valve body to be designed more freely, since the inlet valve body can be designed to close the outlet opening of the inlet channel with less consideration of the inlet opening of the first outlet channel and the inlet opening of the second outlet channel. Such an embodiment can reduce the risk that the inlet valve body will cover the inlet opening of the first or second outlet channel.

In a preferred embodiment, the first part of the inlet channel leads from a location below a horizontal plane which is arranged in such a way that it intersects the lowest point of that of the two outlet channels that is located deepest of the two outlet channels (first outlet channel and second outlet channel) to a place above that plane.

In a preferred embodiment, the first part of the inlet channel leads from a location below a horizontal plane which is arranged in such a way that it intersects the highest point of that of the two outlet channels that is located highest of the two outlet channels (first outlet channel and second outlet channel), to a place above that plane.

In a preferred embodiment, the first part of the inlet channel leads from a location outside an imaginary area into the interior of the imaginary area, whereby it is particularly preferred that the transition from the first part of the inlet channel to the second part of the inlet channel is arranged in this area, and wherein the imaginary area is limited by the inlet side on the one side and by the outlet side on the other side and by an envelope surrounding the edge of the inlet side and the edge of the outlet side. For example, if the inlet and outlet sides are round, the envelope is shaped like a side surface of a cylinder (if the inlet and outlet sides are the same size) or the side surface of a truncated cone (if the inlet and outlet sides are not the same size).

In a preferred embodiment, a coupling of the inlet valve body to the outlet valve body, which closes the outlet opening of the first outlet channel in a closed position and releases the outlet opening of the first outlet channel in an open position, is provided.

It is particularly preferable that the coupling be a rigid coupling. It is particularly preferable that the coupling be effected in that the inlet valve body is connected to the outlet valve body via a rigid component. If, according to a preferred embodiment, the inlet valve body is designed as a screen of an umbrella valve, the pin of the screen can be used for such a coupling. It is conceivable that a "double umbrella valve" is created in which the inlet valve body is formed by a screen and a pin in the manner of an umbrella valve and the outlet valve body is also designed in the manner of an umbrella valve using the same pin by providing a further umbrella at the opposite end.

However, embodiments are also conceivable in which the coupling is an elastic coupling. It is particularly preferable that the coupling be effected in that the inlet valve body is connected to the outlet valve body via an elastic component. If, according to a preferred embodiment, the inlet valve body is designed as a screen of an umbrella valve, the pin of the screen can be used for such a coupling (if the pin is made from an elastomer, for example). It is conceivable that a "double umbrella valve" is created in which the inlet valve body is formed by a screen and a pin in the manner of an umbrella valve and the outlet valve body is also designed in the manner of an umbrella valve using the same pin by providing a further umbrella at the opposite end. By using an elastomer for the pin, the pretension with which the shields of the umbrella valve are pressed onto the surfaces to be sealed can be adjusted.

The coupling can cause the inlet valve body to be in the closed position if the outlet valve body, which closes the outlet opening of the first outlet channel in the closed position and releases the outlet opening of the first outlet channel in an open position, is in the open position. Additionally or alternatively, the coupling can cause the inlet valve body to be in the open position when the outlet valve body, which closes the outlet opening of the first outlet channel in a closed position and releases the outlet opening of the first outlet channel in an open position, is in the closed position. Such a coupling offers advantages in the control of a diaphragm pump, since this coupling can ensure that the inlet valve body is in the closed position when the outlet valve body, which closes the outlet opening of the first outlet channel in a closed position and releases the outlet opening of the first outlet channel in an open position, is in the open position. Such a coupling offers advantages in the control of a diaphragm pump, since this coupling can ensure that the inlet valve body is in the open position when the outlet valve body, which closes the outlet opening of the first outlet channel in a closed position and releases the outlet opening of the first outlet channel in an open position, is in the closed position. If two outlet valve bodies are provided, a coupling between the inlet valve body and the two outlet valve bodies is also conceivable, which synchronizes the movements of the inlet valve body and the two outlet valve bodies.

In a preferred embodiment, the inlet valve body and/or the outlet valve body is a valve body of an umbrella valve. In a preferred embodiment, the valve body is made from an elastomer, preferably from an ethylene-propylene-diene rubber (EPDM).

According to the invention, it was also recognized that a valve body according to the invention of a valve for a diaphragm pump can offer advantages if the valve body is designed as a screen, the screen being shaped like a circle from which at least one section has been removed or an ellipse in which at least one section has been removed. Such a valve body is suitable for closing the outlet opening of an inlet channel in a closed position. However, the circle section removed according to the invention or the ellipse section removed according to the invention creates a space in which the inlet opening for an outlet channel can be located. Such a valve body thus makes it possible to arrange the outlet opening of an inlet channel closer to an inlet opening of an outlet channel. In a preferred embodiment, the screen is designed in the form of a circle, with two opposing circle sections having been removed. This creates the possibility of bringing the vertically arranged inlet opening of a first outlet channel and the inlet opening of a second outlet channel, when the outlet opening of an inlet channel is arranged between the inlet openings, closer to the outlet opening of the inlet channel. In a preferred embodiment, the screen is designed in the shape of an ellipse, two opposing ellipse sections having been removed. This creates the possibility of bringing the vertically arranged inlet opening of a first outlet channel and the inlet opening of a second outlet channel, when the outlet opening of an inlet channel is arranged between the inlet openings, closer to the outlet opening of the inlet channel. In a preferred embodiment, the screen is designed in the form of a square, two opposite rectangular sections having been removed so that the screen is rectangular. This creates the possibility of bringing the vertically arranged inlet opening of a first outlet channel and the inlet opening of a second outlet channel, when the outlet opening of an inlet channel is arranged between the inlet openings, closer to the outlet opening of the inlet channel.

In a preferred embodiment, the inlet valve body of the valve assembly according to the invention is designed in the manner of the valve body according to the invention.

In a preferred embodiment, the outlet opening of the inlet channel is round, elliptical, or shaped like a circular arc segment. Embodiments are conceivable in which the outlet opening of the inlet channel is formed by a plurality of outlet opening sections. For example, the outlet opening sections themselves can in turn be designed round, elliptical, or shaped like a circular arc segment. It is thus conceivable that the outlet opening of the inlet channel is embodied in a plate that is placed on a body in which, for example, the second part of the inlet channel is embodied. In this plate, openings can be made distributed over the cross section that the second part of the inlet channel, taken here as an example, has in the body, which together form the outlet opening of the inlet channel; the second part of the inlet channel would have a sieve or a perforated plate as a closure. This embodiment offers itself as an alternative for a branching inlet channel in which, after the first part of the inlet channel, there is a branching into several second parts of the inlet channel running next to one another, each second part being designed with its own outlet opening on the inlet side of the valve assembly.

In a preferred embodiment, the inlet opening of the first outlet channel and/or the outlet opening of the first outlet channel is round, elliptical, or shaped like a circular arc segment. Embodiments are conceivable in which the outlet opening of the first outlet channel is formed by a plurality of outlet opening sections. For example, the outlet opening sections themselves can in turn be designed round, elliptical, or shaped like a circular arc segment. This embodiment offers itself as an alternative to an embodiment which is also possible, in which a plurality of narrow outlet channels are provided, which run next to one another from the inlet side to the outlet side of the valve assembly. In one embodiment, the first outlet channel is a channel which is closed on the outlet side by a sieve or a perforated plate; in the other embodiment, a plurality of channels running next to one another are provided, which lead from the inlet side to the outlet side. The embodiment is particularly preferred in which a plurality of narrow outlet channels are provided, which run next to one another from the inlet side to the outlet side of the valve assembly. In a preferred embodiment, the inlet opening of the second outlet channel and/or the outlet opening of the second outlet channel is round, elliptical, or shaped like a circular arc segment. Embodiments are conceivable in which the outlet opening of the second outlet channel is formed by a plurality of outlet opening sections. For example, the outlet opening sections themselves can in turn be designed round, elliptical, or shaped like a circular arc segment. This embodiment offers itself as an alternative to an embodiment which is also possible, in which a plurality of narrow outlet channels are provided, which run next to one another from the inlet side to the outlet side of the valve assembly. In one embodiment, the first outlet channel is a channel which is closed on the outlet side by a sieve or a perforated plate; in the other embodiment, a plurality of channels running next to one another are provided, which lead from the inlet side to the outlet side.

In a preferred embodiment, the first outlet channel has the same cross-sectional shape at least in sections, but preferably over its entire length. This cross-sectional shape is preferably a circle or an ellipse. In a preferred embodiment, the second outlet channel has the same cross-sectional shape at least in sections, but preferably over its entire length. This cross-sectional shape is preferably a circle or an ellipse. In a preferred embodiment, the first part of the inlet channel has the same cross-sectional shape at least in sections, but preferably over its entire length. This cross-sectional shape is preferably a circle or an ellipse. In a preferred embodiment, the second part of the inlet channel has the same cross-sectional shape at least in sections, but preferably over its entire length. This cross-sectional shape is preferably a circle or an ellipse.

The valve plate according to the invention of a diaphragm pump has a valve assembly according to the invention and/or a valve body according to the invention integrated in the valve plate.

Diaphragm pumps, as they are known from the prior art, for example from DE 10 2008 035 592 B4 or EP 3 327 287 A1, are often assembled by lining up plates. For example: The diaphragm pump shown in FIG. 1 of EP 3 327 287 A1 has a front plate, an intermediate plate (which can also be referred to as a chamber housing), a valve plate and an end plate (which can also be referred to as a diaphragm carrier) with a pump diaphragm, which is connected via pump elements with the swash plate not shown in FIG. 1 of EP 3 327 287 A1. The invention has recognized that the advantages of the invention are already achieved by equipping the valve plate with the valve assembly according to the invention in such a diaphragm pump structure. In the case of an existing diaphragm pump of the prior art, simply replacing the valve plate can lead to the advantages of the invention being achieved in this diaphragm pump. The valve plate is therefore an independently marketable item that can be sold, for example, for retrofitting existing diaphragm pumps.

In a preferred embodiment, the valve plate according to the invention has a one-piece base body into which the first outlet channel, the second outlet channel, and the inlet channel are inserted. This can be done, for example, by a machining process or by etching. It is also conceivable to manufacture the base body of the valve plate by a casting process, whereby the first outlet channel, the second outlet channel, and the inlet channel can either be inserted into the base body afterwards (through a machining process, for example), or can be already generated during casting by the geometry of the casting mold. It is also conceivable to manufacture the valve plate by additive manufacturing, preferably by 3D printing.

In a preferred embodiment, the valve plate has a chamber side. The chamber side is the side that faces a pumping chamber when the pumping chamber is formed in a separate plate adjoining the valve plate, or is the side in which part or the entire pumping chamber is embodied. In a preferred embodiment, the inlet side of the valve assembly according to the invention forms part of the chamber side of the valve plate according to the invention. In a preferred embodiment, it is conceivable that the inlet side of the valve assembly according to the invention forms the base of a recess made in the chamber side of the valve plate according to the invention. This means that part or all of the pumping chamber can be formed in the valve plate itself. A recess that forms the pumping chamber and is made in the chamber side of the valve plate according to the invention could be closed by a diaphragm attached to the chamber side of the valve plate, which can generate the pump strokes through its movement.

In a preferred embodiment, the valve plate has an inlet/outlet side. The inlet/outlet side is the side that faces an inlet volume and an outlet volume if the inlet volume and the outlet volume are formed in a separate plate adjoining the valve plate, or is the side in which part or all of the outlet volume or part or all of the inlet volume is embodied. In a preferred embodiment, the outlet side of the valve assembly according to the invention forms part of the one inlet/outlet side of the valve plate according to the invention. In a preferred embodiment, it is conceivable that the outlet side of the valve assembly according to the invention forms the base of a recess made in the inlet/outlet side of the valve plate according to the invention.

In a preferred embodiment, the valve plate has several valve assemblies according to the invention integrated into the valve plate, or a plurality of valve bodies according to the invention. In a preferred embodiment, the valve plate has two, three, four, five, six, or even more than six valve assemblies according to the invention or valve bodies according to the invention integrated into the valve plate. In a preferred embodiment, if there is a plurality of valve assemblies according to the invention provided on the valve plate according to the invention, these are arranged uniformly on a ring around a point, preferably around the center point of the valve plate. In a preferred embodiment, if there are several valve assemblies according to the invention integrated in a valve plate according to the invention, the position of the first outlet channel relative to the second outlet channel and/or the location of the first outlet channel relative to the second part of the inlet channel is the same for all valve assemblies. In all valve assemblies according to the invention integrated in a valve plate according to the invention, it is particularly preferable if the first outlet channel is arranged above the second part of the inlet channel and/or the second part of the inlet channel is arranged above the second outlet channel. In a preferred embodiment, in all valve assemblies according to the invention of the valve plate according to the invention, the first outlet channel is arranged directly above the second outlet channel. However, embodiments are also conceivable in which the inlet opening of the first outlet channel and the inlet opening of the second outlet channel of each valve assembly lie on one line, all of these lines intersecting at a point on the valve plate (radial arrangement).

In a preferred embodiment, the valve plate according to the invention has through holes. Screws, for example, with which the individual plates of a diaphragm pump can be connected to one another, can be passed through these through holes.

In a preferred embodiment, the valve plate according to the invention has an inlet chamber. It is particularly preferred that the inlet chamber be designed as a cup-like recess which extends from the inlet/outlet side into the interior of the valve plate. In a preferred embodiment, the first part of the inlet channel leads from this inlet chamber to the second part of the inlet channel. If, in a preferred embodiment, multiple valve assemblies according to the invention are provided on the valve plate according to the invention, then in a preferred embodiment each first part of each inlet channel leads from the inlet chamber to the respective second part of the respective inlet channel. In a preferred embodiment, the respective first parts of the inlet channels are designed in a star shape to continue from the inlet chamber. In a preferred embodiment, the inlet chamber is arranged in the center of the valve plate.

In a preferred embodiment, the inlet/outlet side of the valve plate according to the invention has an annular groove for receiving a gasket. In a preferred embodiment, two concentric annular grooves are provided, each for receiving a sealing ring. The first annular groove runs around an inlet chamber provided in the preferred embodiment. The second annular groove runs around the outside of the valve assemblies according to the invention provided on the valve plate according to the invention.

In a preferred embodiment, annular grooves for receiving gaskets are provided on the diaphragm side of the valve chamber.

The diaphragm pump according to the invention has a valve assembly according to the invention and/or a valve plate according to the invention and/or a valve body according to the invention.

In a preferred embodiment, the membrane has a front plate. An inlet opening and an outlet opening on the front side of the front plate or on the circumference of the front plate can be provided on the front plate. An outlet volume and an inlet volume can be provided on the rear side of the front plate. A channel embodied in the front plate connects the outlet opening with the outlet volume. A channel provided in the front plate connects the inlet opening with the inlet volume. It is particularly preferable that the inlet volume be designed in the middle and surrounded by an outlet volume designed in the form of a ring.

In a preferred embodiment, a valve plate according to the invention is attached to the rear of the front plate. The outlet sides of the valve assemblies according to the invention, which are provided on the valve plate according to the invention, adjoin the outlet volume of the front plate, or if, according to a preferred embodiment, the outlet sides form the base of a cup-shaped recess in the valve plate, the cup-shaped recess of the valve plate, the base of which is arranged on the outlet side of the valve assembly, opens towards the outlet volume. In a preferred embodiment, the respective first part of the inlet channel of the respective valve assembly is connected to the inlet volume. This can be done in that the first part of the inlet channel opens directly at an inlet/outlet side of the valve plate and thus opens into the inlet volume provided on the rear of the front plate when the valve plate abuts the rear of the front plate. In an alternative embodiment, it can be provided that the valve plate has a cup-shaped recess on its inlet/outlet side which opens towards the inlet volume when the valve plate is attached to the rear of the front plate. As described above, the respective first parts of the inlet channels can be continued from such a cup-shaped inlet chamber.

In a preferred embodiment, the side of the valve plate opposite the front plate (the diaphragm side of the valve plate) is adjoined by an end plate, which can also be referred to as a diaphragm carrier, with pump diaphragms. In a preferred embodiment, the pump chambers are designed as cup-shaped recesses in the valve plate, which extend from the diaphragm side of the valve plate inward into the valve plate and at the bottom of which the inlet side of the respective valve assembly is arranged. These cup-shaped pump chambers can be closed by placing a diaphragm on the diaphragm side of the valve plate. One diaphragm is provided for each pumping chamber. The respective pump diaphragm can be connected to a swash plate arranged in a drive chamber of the diaphragm pump via a pump element assigned to it. To that end, the pump diaphragm can be set in a tumbling, axial, periodic pumping movement by a tumbling motion of the swash plate. The swash plate can sit on a drive pin of a drive shaft connected to the drive.

In a preferred embodiment, the diaphragm pump according to the invention has several valve assemblies according to the invention or several valve bodies according to the invention or several valve plates according to the invention.

In a preferred embodiment, a line connecting the surface center of the inlet side with the surface center of the outlet side lies parallel to the longitudinal axis of the diaphragm pump or at a small angle to the longitudinal axis of the diaphragm pump, preferably at an angle of less than 45°, more preferably less than 30°, even more preferably less than 25°. In a preferred embodiment, the inlet side forms part of the wall which delimits the pump chamber in the diaphragm pump. In a preferred embodiment, the inlet side delimits the pump chamber and is also arranged opposite the pump chamber on a delimiting diaphragm.

It is particularly preferable that the longitudinal axis of the diaphragm pump be an axis that runs parallel to the direction in which the diaphragms perform their pump strokes. In the case of a rotationally symmetrical valve plate, the longitudinal axis of the diaphragm pump can be the axis around which the rotational symmetry of the valve plate results.

The invention further proposes the use of an inlet valve body coupled to an outlet valve body in a diaphragm pump, wherein that coupling causes a movement of the inlet valve body to cause a movement of the outlet valve body. In the case of diaphragm pumps, such a coupling can bring about a safe and simultaneous opening and closing of an outlet opening of an inlet channel and an outlet opening of an outlet channel.

The invention also proposes a method for operating a diaphragm pump, wherein the diaphragm pump has a pumping chamber adjoined to a movable diaphragm, wherein a movement of the diaphragm in a first direction (the "suction direction") increases the volume of the pumping chamber and a movement of the diaphragm in the opposite direction (the "pressure direction") reduces the volume of the pumping chamber, and the diaphragm pump has a valve assembly according to the invention, wherein the inlet side of the valve assembly adjoins the pumping chamber. The method provides that the diaphragm is moved in the suction direction, which will pull the inlet valve body towards its open position. Furthermore, the method provides that the diaphragm is moved in the pressure direction, which will press the inlet valve body towards its closed position.

It is particularly preferable that the diaphragm pump according to the invention be used in the field of chemistry, pharmacy or biotechnology, as the media to be pumped are sometimes very expensive, making it desirable that no volume of the pumped medium (or as little as possible) remain in the membrane pump after the pumping process. Furthermore, pumping capacity is improved if such diaphragm pumps are completely filled with the fluid without air pockets. Conceivable areas of application are tangential flow filtration and chromatography.

Figure 2:
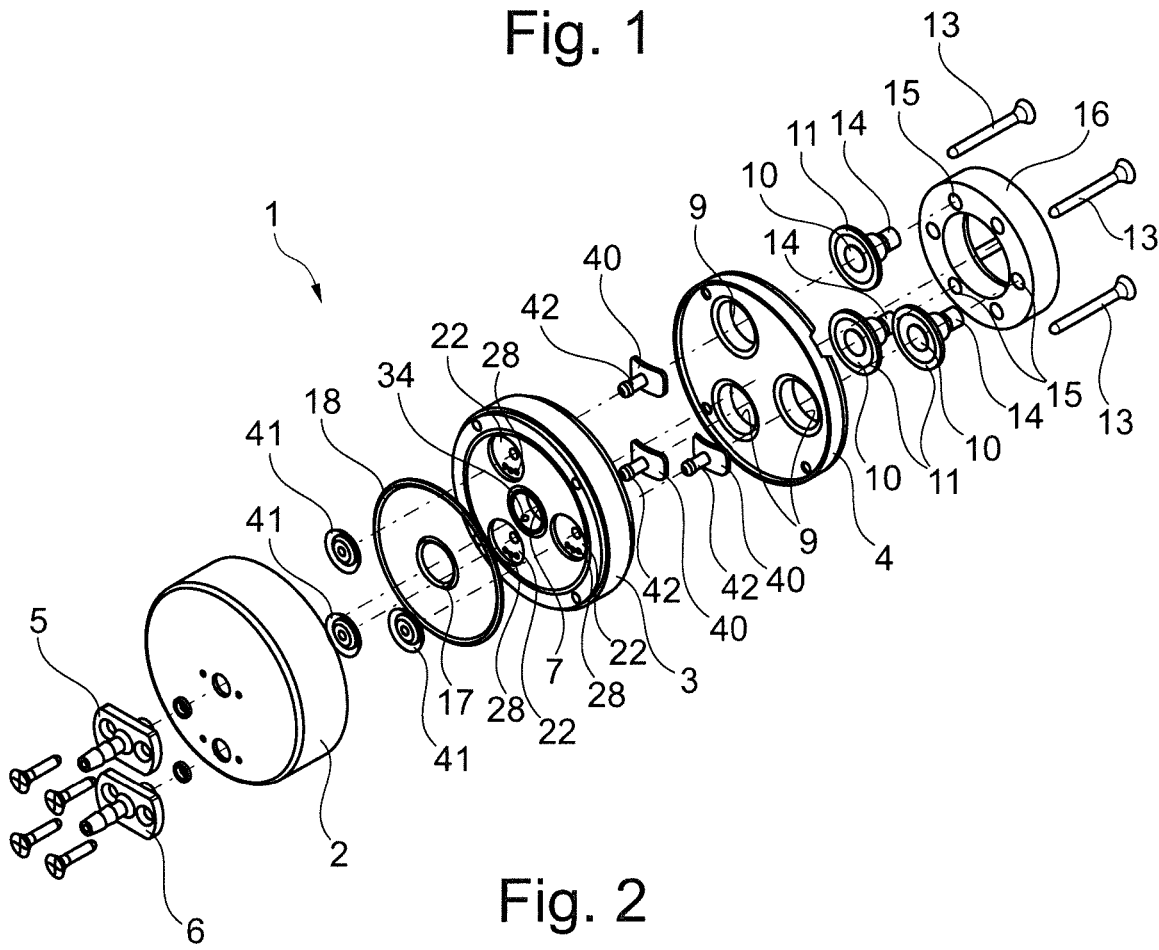
Figure 3:
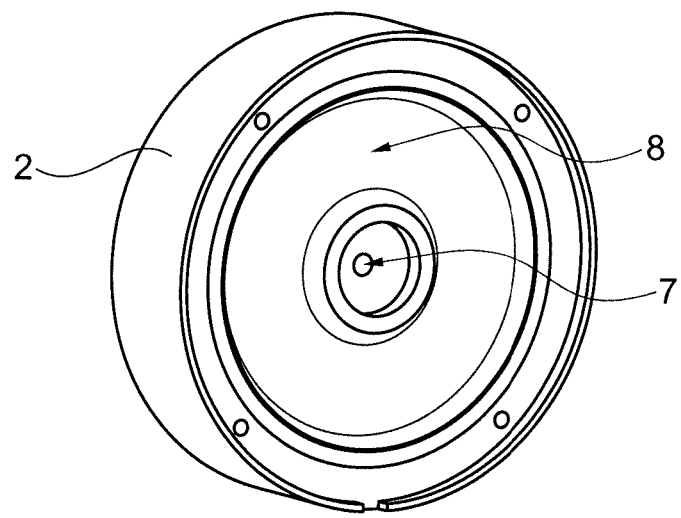
Figure 6:
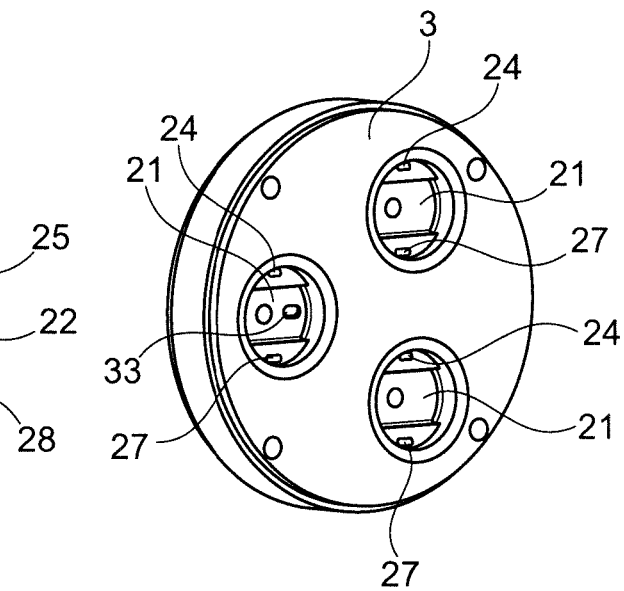
Figure 5:
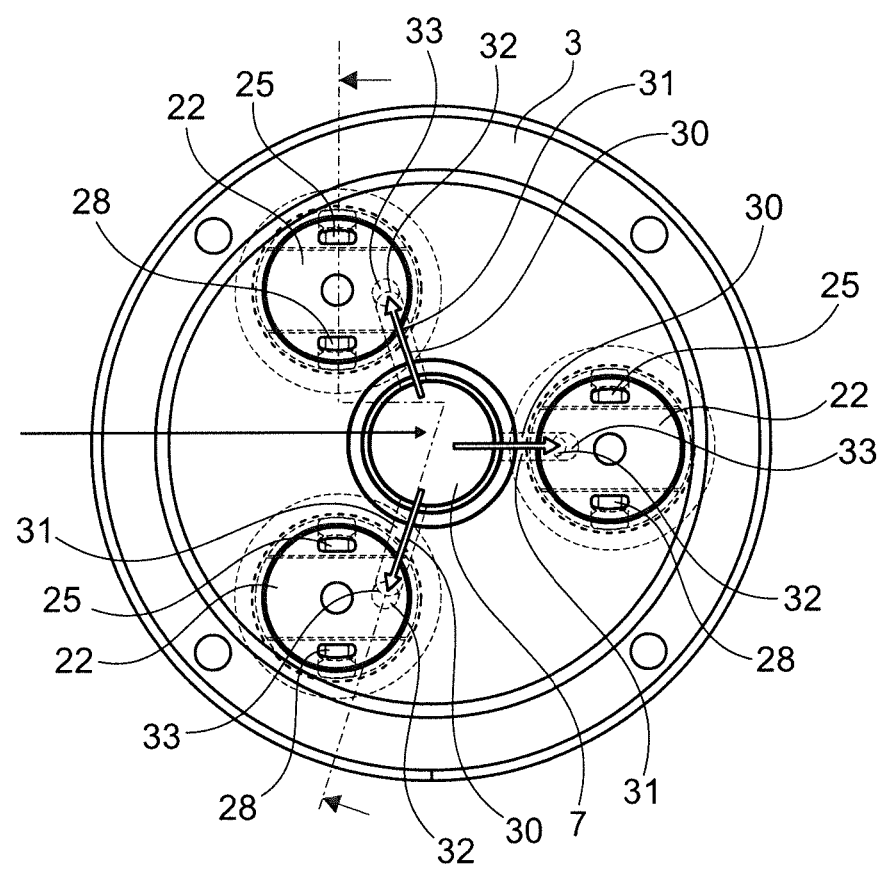
Figure 10:
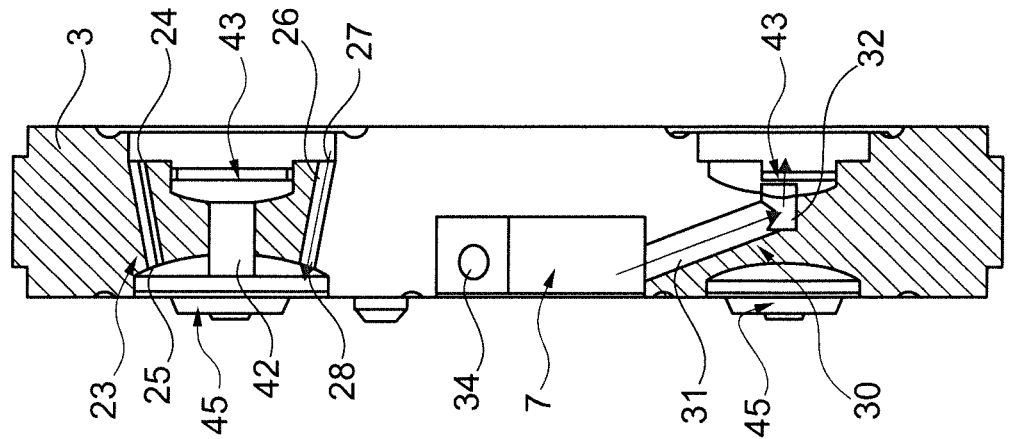
Figure 9:
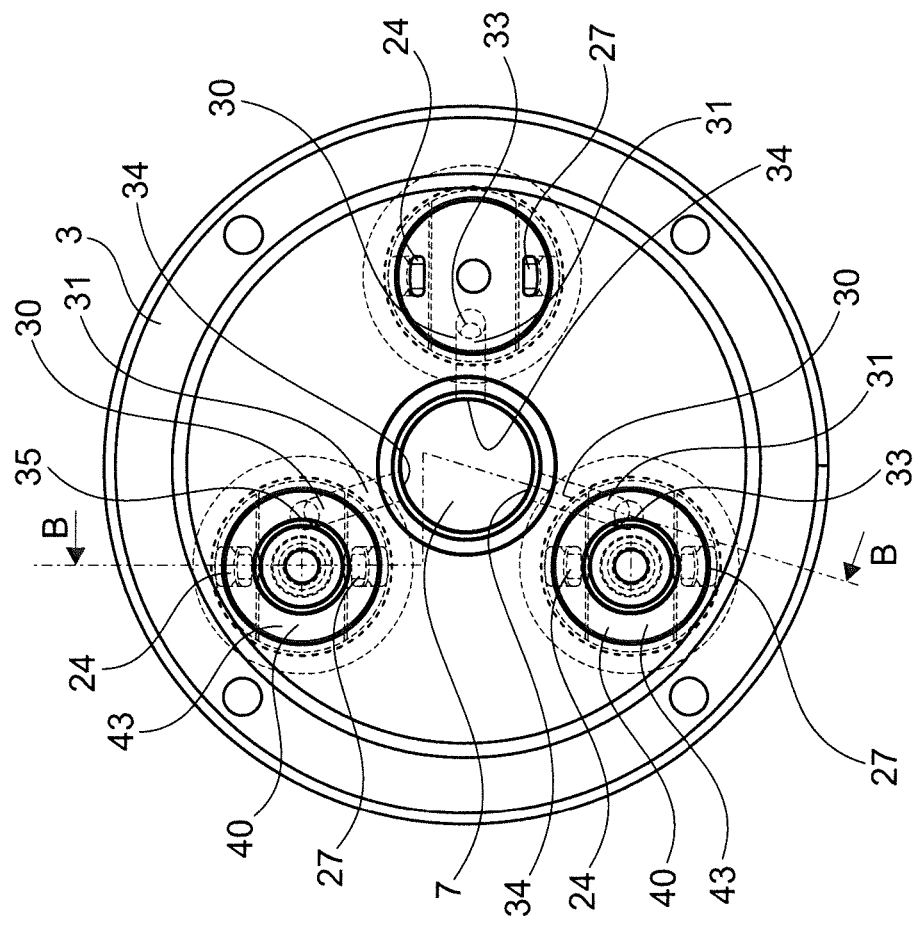
Figure 11:
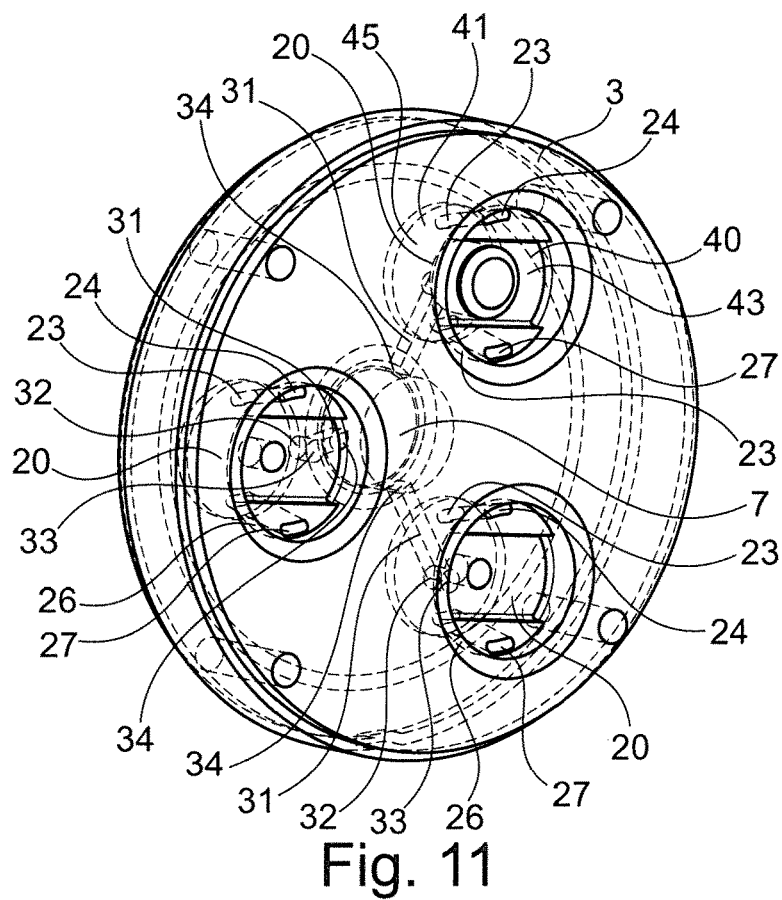
Figure 12:
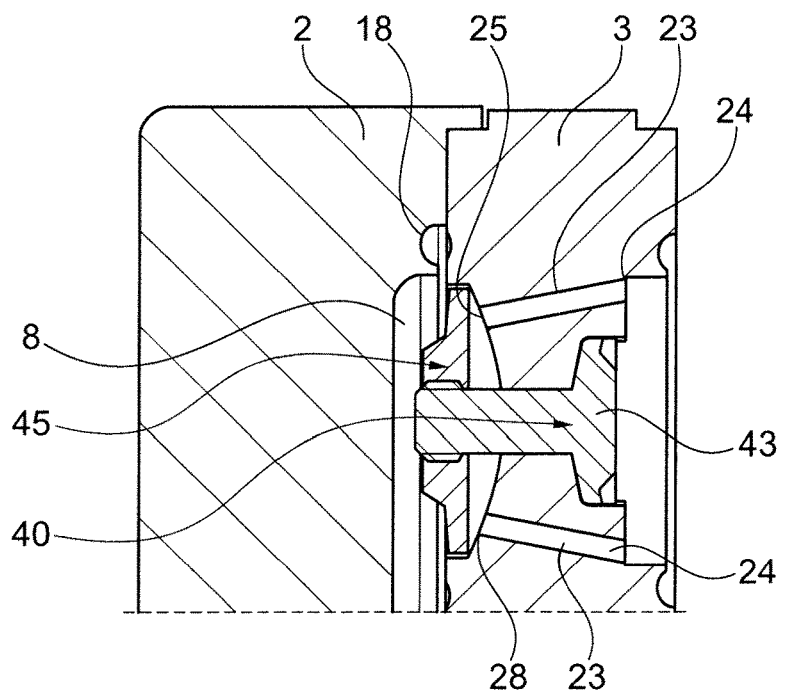
Figure 13:
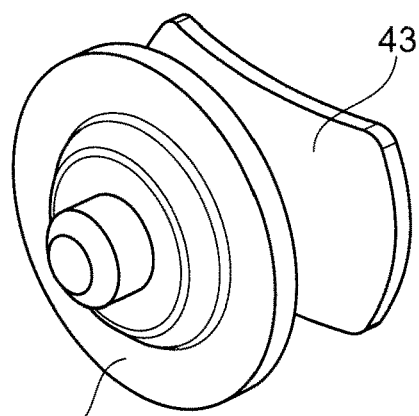
Figure 14:
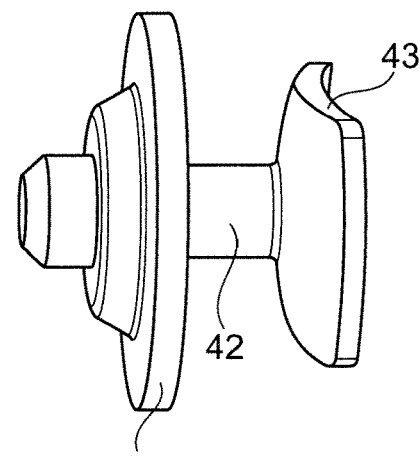
Figure 15:
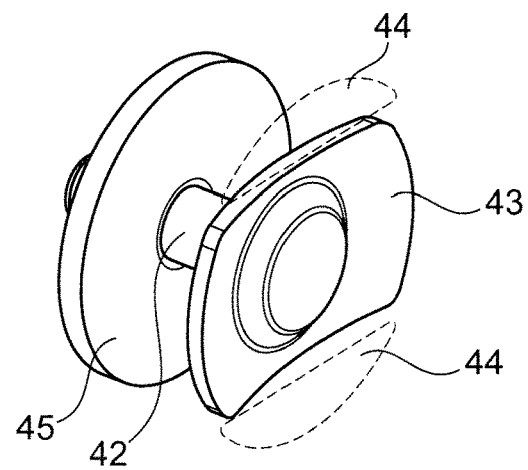

The invention is explained in more detail below with the aid of a drawing which merely shows exemplary embodiments. The figures show the following:

FIG. 1 a diaphragm pump in a perspective view;

FIG. 2 an exploded view of the diaphragm pump illustrated in FIG. 1;

FIG. 3 a perspective view from behind the front panel of the diaphragm pump according to FIG. 1;

FIG. 4 a perspective view from the front of a valve plate of the diaphragm pump according to FIG. 1;

FIG. 5 a front view of a valve plate of the diaphragm pump according to FIG. 1;

FIG. 6 a perspective view from behind a valve plate of the diaphragm pump according to FIG. 1;

FIG. 7 a view from behind the diaphragm pump according to FIG. 1;

FIG. 8 a sectional view of the diaphragm pump according to FIG. 1 along the line A-A in FIG. 7;

FIG. 9 a view from the front of the valve plate according to FIG. 5;

FIG. 10 a sectional view of the valve plate according to FIG. 7 along the line B-B in FIG. 9;

FIG. 11 a partially transparent perspective view of the valve plate according to FIG. 9;

FIG. 12 a sectional side view of a valve of the valve plate according to FIG. 9 and FIGS. 13, 14, and 15 perspective views of the valve body according to the invention.

The diaphragm pump 1 particularly shown in FIGS. 1, 2, and 8 has a front plate 2, a valve plate 3, and a diaphragm plate 4. The front plate 2, the valve plate 3, and the membrane plate 4 are screwed together by means of four screws 13.

An inlet adapter 5 and an outlet adapter 6 are screwed onto the front of the front plate 2. In the design shown here, the inlet adapter 5 and the outlet adapter 6 allow hoses to be pushed on and held simply and securely. However, other types of connection are also conceivable, such as smart couplings. O-ring gaskets seal the inlet adapter 5 and the outlet adapter 6 against the base body of the front plate 2.

On the back of the front panel 2 (see FIG. 3), an inlet volume 7 is formed. The inlet volume 7 partially extends into the valve plate 3 (see. FIGS. 2, 4, 5, 8, 9, 10, and 11). The inlet volume 7 is surrounded by a gasket 17. Furthermore, on the rear side of the front panel 2 (see FIG. 3), an outlet volume 8 is formed. The outlet volume 8 is surrounded by a gasket 18. The diaphragm plate 4 has three openings 9. A diaphragm 10 is arranged in each opening 9. As the sectional drawing in FIG. 8 shows, the respective diaphragm 10 lies with a circumferential bead 11 in a recess 12 formed on the front side of the diaphragm plate 4 and is held there by the screw connection of the diaphragm plate 4 to the valve plate 2 (screws 13). The respective diaphragm 10 has a drive pin 14. The respective drive pin 14 has an external thread with which it is screwed into an internal thread of an opening 15 in a support ring 16. The support ring 16 can be set in a tumbling motion with a drive (not shown), which causes the drive pins 14 of the diaphragm 10 to be moved alternately backwards (=away from the valve plate 2) or forwards (=towards the valve plate 2). As a result, the pump stroke of the respective diaphragm 10 is generated. Due to the tumbling motion, the respective pump strokes are offset in time so that the diaphragm pump pumps more evenly and pulsation in the pumped fluid is avoided or reduced.

The diaphragm pump 1 shown is designed with three pump chambers. It is conceivable that diaphragm pumps according to the invention are also designed with two pump chambers, but it is particularly preferable for them to have more than three pump chambers (with four, five, six, seven or even more pump chambers, for example). The more pumping chambers used, the higher the structural design and the number of parts to be installed, but the more the pulsation in the pumped fluid can be avoided or reduced.

The three holes also provided on the support ring 16 can be used to receive pins that are located on the driving swash plate and prevent relative rotation of the swash plate.

The valve plate 2 has three valve assemblies 20 according to the invention. Each valve assembly 20 has an inlet side 21 pointing towards the diaphragm plate 4 and an outlet side 22 pointing towards the front side 2. Each valve assembly 20 has a first outlet channel 23, which leads from an inlet opening 24 arranged on the inlet side 21 and assigned to the first outlet channel 23 to an outlet opening 25 arranged on the outlet side 22 and assigned to the first outlet channel 23. Each valve assembly has a second outlet channel 26, which leads from an inlet opening 27 arranged on the inlet side 21 and assigned to the second outlet channel 26 to an outlet opening 28 arranged on the outlet side 22 and assigned to the second outlet channel 26. Each first outlet channel 23 is arranged above the second outlet channel 26.

Each valve assembly 20 has an inlet channel 30. Each inlet channel 30 has a first part 31 and a second part 32 adjoining the first part 31. The second part 32 has an outlet opening 33 which is arranged on the inlet side 21. The first part 31 extends at an angle to the second part 32. The second part 32 of the inlet channel 30, viewed in the vertical direction, is arranged between the first outlet channel 23 and the second outlet channel 26.

At the outlet opening 33 of the second part 32 of the inlet channel 30, an inlet valve body 40 is provided, which closes the outlet opening 33 in a closed position (see FIG. 12) and releases the outlet opening 33 in an open position.

At the outlet opening 25 of the first outlet channel 23, an outlet valve body 41 is provided, which closes the outlet opening 25 in a closed position and releases the outlet opening 25 in an open position. The outlet valve body 41, which closes the outlet opening 25 of the first outlet channel 23 in a closed position and releases the outlet opening 25 of the first outlet channel 23 in an open position, is designed in such a way that in the closed position, in which it closes the outlet opening 25 of the first outlet channel 23, it also closes the outlet opening 28 of the second outlet channel 26, and that when in the open position, in which it releases the outlet opening 25 of the first outlet channel 23, it also releases the outlet opening 28 of the second outlet channel 26.

The first outlet channel 23 runs along a longitudinal axis (see FIG. 8, FIG. 10). The second outlet channel 26 runs along a longitudinal axis (see FIG. 8, FIG. 10). The angle between the longitudinal axis of the first outlet channel 23 and the longitudinal axis of the second outlet channel 26 is less than 90°, namely about 20° (see FIG. 10).

The second part 32 of the inlet channel 30 runs (at least for part of its extension) along a longitudinal axis. The angle between the longitudinal axis of the first outlet channel 23 and the longitudinal axis of the second part 32 of the inlet channel 30 is smaller than 90°, namely about 10° (the longitudinal axis of the second part 32 of the inlet channel 30 runs approximately horizontally in the embodiment shown here (see FIG. 8) and the longitudinal axis of the first outlet channel 23 runs approximately 10° to the horizontal). The angle between the longitudinal axis of the second outlet channel 26 and the longitudinal axis of the second part 32 of the inlet channel 30 is less than 90°, namely about 10° (the longitudinal axis of the second part 32 of the inlet channel 30 runs approximately horizontally in the embodiment shown here (see FIG. 8) and the longitudinal axis of the second outlet channel 26 runs approximately 10° to the horizontal).

The first part 31 of the inlet channel 30 runs along a longitudinal axis. The angle between the longitudinal axis of the first part 31 of the inlet channel 30 and the longitudinal axis of the second part 32 of the inlet channel 30 is greater than 90° (see FIG. 8). The angle between the longitudinal axis of the first outlet channel 23 and the longitudinal axis of the first part 31 of the inlet channel 30 is greater than 90° (see FIG. 8). The angle between the longitudinal axis of the second outlet channel 26 and the longitudinal axis of the first part 31 of the inlet channel 30 is greater than 90° (see FIG. 8).

The inlet valve body 40 is coupled to the outlet valve body 41 of the respective valve assembly 20. Due to the coupling, the inlet valve body 40 is in the closed position when the outlet valve body 41 is in the open position. The coupling is effected by a web 42. The inlet valve body 40 is designed as an umbrella valve that has a screen 43 and the web 42. The screen 43 is designed in the form of a circle, with a circular segment 44 removed at the top and a circular segment 44 removed at the bottom. The outlet valve body 41 is designed as an umbrella valve with a circular umbrella 45 and the web 42. The web 42 thus forms part of the inlet valve body 40 and part of the outlet valve body 41.

The first part 31 of the inlet channel 30 has an inlet opening 34. This is provided on that part of the inlet volume 7 arranged in the valve plate 3. As shown in FIGS. 9 and 11, three inlet openings 34 are thus provided on the part of the inlet volume 7 arranged in the valve plate 3, namely for each first part 31 of the respective inlet channel 30 of the total of three valve assemblies 20.

For better clarity, the view in FIG. 11 shows only one valve assembly 20 with inlet valve body 40 and outlet valve body 41. In the case of the other two valve assemblies 20, the respective inlet valve body 40 and the respective outlet valve body 41 are not shown, in order to better illustrate the guidance of the first outlet channel 23, the second outlet channel 26, and the inlet channel 30. For better clarity, the view in FIG. 9 shows only two valve assemblies 20 with inlet valve bodies 40. In the case of the third valve assembly 20, the inlet valve body 40 is not shown, in order to be able to better illustrate the guidance of the first outlet channel 23, the second outlet channel 26, and the inlet channel 30.

During the operation of the diaphragm pump, a withdrawal of the diaphragm 10 (=a movement of the diaphragm 10 away from the valve plate 3) leads to a negative pressure in the pump chamber formed between the inlet valve body 40 and the diaphragm 10. The negative pressure causes the inlet valve body 40 to be pulled into its open position (=away from the front plate 2) and the outlet valve body 41 to be pulled into its closed position (=away from the front plate 2). The outlet opening 33 of the inlet channel 30 is thus released. The fluid to be pumped is conveyed by the negative pressure from the inlet volume 7 through the inlet opening 34 into the first part 31 of the inlet channel 30 and from there into the second part 32 of the inlet channel 30 and leaves the inlet channel 30 via the opened outlet opening 33. In this part of the pumping cycle, the fluid to be pumped cannot leave the pumping chamber, since both the outlet opening 25 of the first outlet channel 23 and the outlet opening 28 of the second outlet channel 26 are closed by the outlet valve body 41. This fluid movement is indicated by the arrows provided in the lower part of FIG. 10 and the arrows indicated in FIG. 5 and FIG. 11.

The arrows in FIGS. 5, 10, and 11, which show the suction motion, serve solely to illustrate the flow movement of the fluid in the respective suction motion of the respective valve assembly 20. Since the suction motions—as stated above—of the respective valve assemblies 20 are offset in time, the respective flow movement is of course offset in time. The form of presentation selected for FIGS. 5, 10, and 11 is not intended to show that the suction movements take place at the same time (even if, for example, in FIGS. 5 and 11 the arrows are shown for all valve assemblies). The arrows serve solely to represent the fluid movement during the respective suction motion, without indicating that these suction motions take place at the same time; they are of course staggered. FIG. 10 shows through the arrows provided there, for example, that the lower valve assembly 20 carries out a suction motion (fluid is drawn from the inlet volume 7 into the pumping chamber), while the upper valve assembly 20 carries out an ejection motion (fluid is pumped through the first outlet channel 23 and the second outlet channel 26 into the outlet volume 8.

During operation of the diaphragm pump, advancing the diaphragm 10 (=a movement of the diaphragm 10 towards the valve plate 3) leads to an overpressure in the pumping chamber formed between the inlet valve body 40 and the diaphragm 10. The overpressure has the effect that the inlet valve body 40 is pushed into its closed position (=towards the front plate 2) and the outlet valve body 41 is pushed into its open position (=towards the front plate 2). The outlet opening 33 of the inlet channel 30 is thus closed. The outlet opening 25 of the first outlet channel 23 and the outlet opening 28 of the second outlet channel 26 are released. The fluid to be pumped is pressed by the overpressure from the pumping chamber through the inlet opening 24 of the first outlet channel 23 into the first outlet channel 23 and through the outlet opening 25 out of this into the outlet volume 8 and through the inlet opening 27 of the second outlet channel 26 into the second outlet channel 26 and pushed out of this through the outlet opening 28 into the outlet volume 8. This fluid movement is indicated by the arrows provided in the upper part of FIG. 10.

The invention claimed is:

1. A valve assembly for a diaphragm pump, the valve assembly formed in a valve plate having a first side and a second side, the valve assembly comprising:
   a first outlet channel extending through the valve plate from an inlet opening arranged on the first side and assigned to the first outlet channel, to an outlet opening arranged on the second side and assigned to the first outlet channel;
   a second outlet channel extending through the valve plate from an inlet opening arranged on the first side and assigned to the second outlet channel, to an outlet opening arranged on the second side and assigned to the second outlet channel;
   an inlet channel extending through the valve plate, the inlet channel comprising a first part and a second part adjoining the first part, wherein the second part has an outlet opening arranged on the first side of the valve plate, and wherein the first part extends at an angle to the second part and the first part has an inlet opening on the second side of the valve plate;
   an inlet valve body at the outlet opening of the second part of the inlet channel, which closes the outlet opening in a closed position and opens the outlet opening in an open position;
   an outlet valve body on the outlet opening of the first outlet channel, which closes the outlet opening in a closed position and opens the outlet opening in an open position; and
   wherein:
     the first outlet channel runs along a longitudinal axis;
     the second outlet channel runs along a longitudinal axis;
     the second part of the inlet channel runs along a longitudinal axis at least for part of its extension; and
     an angle between the longitudinal axis of the first outlet channel and the longitudinal axis of the second outlet channel is less than 90°; or
     an angle between the longitudinal axis of the first outlet channel and the longitudinal axis of the second part of the inlet channel is less than 90°; or
     an angle between the longitudinal axis of the second outlet channel and the longitudinal axis of the second part of the inlet channel is less than 90°.

2. The valve assembly according to claim 1, wherein:
   the first part of the inlet channel runs along a longitudinal axis for at least part of its extension; and
   an angle between the longitudinal axis of the first part of the inlet channel and the longitudinal axis of the second part of the inlet channel is greater than 90°; or an angle between the longitudinal axis of the first outlet channel and the longitudinal axis of the first part of the inlet channel is less than 90°; or an angle between the longitudinal axis of the second outlet channel and the longitudinal axis of the first part of the inlet channel is less than 90°.

3. The valve assembly according to claim 2, wherein:
the angle between the longitudinal axis of the first part of the inlet channel and the longitudinal axis of the second part of the inlet channel is less than 90°.

4. The valve assembly according to claim 2, wherein:
the angle between the longitudinal axis of the first outlet channel and the longitudinal axis of the first part of the inlet channel is less than 90°.

5. The valve assembly according to claim 2, wherein:
the angle between the longitudinal axis of the second outlet channel and the longitudinal axis of the first part of the inlet channel is less than 90°.

6. The valve assembly according to claim 2, wherein:
the angle between the longitudinal axis of the first part of the inlet channel and the longitudinal axis of the second part of the inlet channel is less than 90°;
the angle between the longitudinal axis of the first outlet channel and the longitudinal axis of the first part of the inlet channel is less than 90°; and
the angle between the longitudinal axis of the second outlet channel and the longitudinal axis of the first part of the inlet channel is less than 90°.

7. The valve assembly according to claim 1, wherein the first outlet channel is arranged above the second outlet channel.

8. The valve assembly according to claim 1, wherein the second part of the inlet channel is arranged between the first outlet channel and the second outlet channel.

9. The valve assembly according to claim 1, further comprising a coupler for coupling the inlet valve body to the outlet valve body that closes the outlet opening of the first outlet channel in a closed position and opens the outlet opening of the first outlet channel in an open position.

10. The valve assembly according to claim 1, wherein the inlet valve body or the outlet valve body is a valve body of an umbrella valve.

11. The valve assembly according claim 1, wherein the inlet valve body is coaxial with the outlet valve body.

12. The valve assembly according to claim 1, wherein:
a dedicated outlet valve body provided on the outlet opening of the second outlet channel, which closes the outlet opening in a closed position and opens the outlet opening in an open position; or
the outlet valve body, which closes the outlet opening of the first outlet channel in a closed position and opens the outlet opening of the first outlet channel in an open position, is configured such that:
in the closed position, in which it closes the outlet opening of the first outlet channel, it also closes the outlet opening of the second outlet channel; and
in the open position, in which it opens the outlet opening of the first outlet channel, it also opens the outlet opening of the second outlet channel.

13. A valve plate of a diaphragm pump, said valve plate comprising:
a first side;
a second side;
an inlet opening arranged on the first side and assigned to a first outlet channel;
an inlet opening arranged on the first side and assigned to a second outlet channel;
an outlet opening arranged on the second side and assigned to the first outlet channel;
an outlet opening arranged on the second side and assigned to the second outlet channel;
an inlet channel extending through the valve plate and comprising a first part and a second part adjoining the first part, wherein the second part has an outlet opening arranged on the first side of the valve plate, and wherein the first part extends at an angle to the second part and the first part has an inlet opening on the second side of the valve plate;
wherein the first outlet channel extends through the valve plate and leads from the inlet opening on the first side assigned to the first outlet channel, to the outlet opening on the second side assigned to the first outlet channel;
wherein the second outlet channel extends through the valve plate and leads from the inlet opening arranged on the first side assigned to the second outlet channel, to the outlet opening on the second side assigned to the second outlet channel;
wherein the outlet opening of the first outlet channel is adapted to cooperate with an outlet valve body for closing the first channel outlet opening in a closed position and opening the first channel outlet opening in an open position; and
wherein:
the first outlet channel runs along a longitudinal axis;
the second outlet channel runs along a longitudinal axis;
the second part of the inlet channel runs along a longitudinal axis at least for part of its extension; and
an angle between the longitudinal axis of the first outlet channel and the longitudinal axis of the second part of the inlet channel is less than 90°.

14. The valve plate according to claim 13, wherein the outlet opening of the second outlet channel is adapted to cooperate with a dedicated outlet valve body to close, thereby closing the second outlet channel in a closed position, and to open, thereby opening the second outlet channel in an open position.

15. The valve plate according to claim 13, wherein:
the outlet opening of the second outlet channel is adapted to cooperate with a dedicated outlet valve body to close, thereby closing the second outlet channel in a closed position, and to open, thereby opening the second outlet channel outlet in an open position; or
the outlet opening of the second outlet channel is adapted to cooperate with the outlet valve body to close, thereby closing the second outlet channel outlet opening in a closed position when the first channel outlet is closed, and to open, thereby opening the second channel outlet in an open position when the first channel outlet is open.

16. The valve plate according to claim 13, wherein:
an angle between the longitudinal axis of the first outlet channel and the longitudinal axis of the second outlet channel is less than 90°; or
an angle between the longitudinal axis of the second outlet channel and the longitudinal axis of the second part of the inlet channel is less than 90°.

17. A diaphragm pump comprising:
a valve assembly formed in a valve plate having a first side and a second side, the valve assembly comprising:
a first outlet channel extending through the valve plate from an inlet opening arranged on the first side and assigned to the first outlet channel, to an outlet opening arranged on the second side and assigned to the first outlet channel;

a second outlet channel extending through the valve plate from an inlet opening arranged on the first side and assigned to the second outlet channel, to an outlet opening arranged on the second side and assigned to the second outlet channel;

an inlet channel extending through the valve plate, the inlet channel comprising a first part and a second part adjoining the first part, wherein the second part has an outlet opening arranged on the first side of the valve plate, and wherein the first part extends at an angle to the second part and the first part has an inlet opening on the second side of the valve plate;

an inlet valve body at the outlet opening of the second part of the inlet channel, which closes the outlet opening in a closed position and opens the outlet opening in an open position;

an outlet valve body on the outlet opening of the first outlet channel, which closes the outlet opening in a closed position and opens the outlet opening in an open position; and wherein:
the first outlet channel runs along a longitudinal axis;
the second outlet channel runs along a longitudinal axis;
the second part of the inlet channel runs along a longitudinal axis at least for part of its extension; and
an angle between the longitudinal axis of the first outlet channel and the longitudinal axis of the second outlet channel is less than 90°; or
an angle between the longitudinal axis of the first outlet channel and the longitudinal axis of the second part of the inlet channel is less than 90°; or
an angle between the longitudinal axis of the second outlet channel and the longitudinal axis of the second part of the inlet channel is less than 90°.

18. The diaphragm pump of claim 17, wherein the inlet valve body is coaxial with the outlet valve body.

19. The diaphragm pump according to claim 17, further comprising a plurality of said valve assemblies.

20. The diaphragm pump of claim 17, wherein:
a dedicated outlet valve body provided on the outlet opening of the second outlet channel, which closes the outlet opening in a closed position and opens the outlet opening in an open position; or
the outlet valve body, which closes the outlet opening of the first outlet channel in a closed position and opens the outlet opening of the first outlet channel in an open position, is configured such that:
in the closed position, in which it closes the outlet opening of the first outlet channel, it also closes the outlet opening of the second outlet channel; and
in the open position, in which it opens the outlet opening of the first outlet channel, it also opens the outlet opening of the second outlet channel.

* * * * *